United States Patent
Karem (10) Patent No.: US 6,935,316 B2
(45) Date of Patent: Aug. 30, 2005

(54) FAIL-OPERATIONAL INTERNAL COMBUSTION ENGINE

(75) Inventor: Abraham E. Karem, Silverado, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/945,832

(22) Filed: Sep. 21, 2004

(65) Prior Publication Data

US 2005/0034703 A1 Feb. 17, 2005

Related U.S. Application Data

(62) Division of application No. 10/762,983, filed on Jan. 22, 2004.
(60) Provisional application No. 60/442,138, filed on Jan. 22, 2003.

(51) Int. Cl.[7] .................................................. F02D 7/00
(52) U.S. Cl. .................................... 123/481; 123/198 D
(58) Field of Search .................................... 123/481, 479, 123/575, 579, 198 F, DIG. 8, DIG. 6; 60/716, 719, 720; 91/181, 178

(56) References Cited

U.S. PATENT DOCUMENTS

| | | |
|---|---|---|
| 1,667,475 A | 4/1928 | Kasley |
| 1,671,479 A | 5/1928 | McIntyre |
| 1,754,192 A | 4/1930 | Van Vliet |
| 2,049,339 A | 7/1936 | Van Atta |
| 2,419,305 A | 4/1947 | Woolson et al. |
| 2,545,458 A | 3/1951 | Ginn |
| 2,821,841 A | 2/1958 | Bartha et al. |
| 2,969,781 A | 1/1961 | Kolbe |
| 3,332,404 A | 7/1967 | Lovercheck |
| 3,390,670 A | 7/1968 | Brice |
| 3,540,420 A | 11/1970 | Syson |
| 3,568,649 A | 3/1971 | Syson et al. |
| 3,852,963 A | 12/1974 | Hufstader |
| 4,038,640 A | 7/1977 | Lee et al. |
| 4,167,857 A | 9/1979 | Nishijima et al. |
| 4,442,805 A * | 4/1984 | Yamakawa ............... 123/198 F |
| 4,742,801 A * | 5/1988 | Kelgard .................. 123/27 GE |
| 4,773,372 A * | 9/1988 | Stumm et al. ............... 123/399 |
| 4,957,072 A | 9/1990 | Goldowsky |
| 5,003,935 A | 4/1991 | Goldowsky |
| 5,033,416 A | 7/1991 | Bousseau |
| 5,138,992 A * | 8/1992 | Krieger ................... 123/198 F |
| 5,156,229 A | 10/1992 | Yasui et al. |
| 5,196,998 A | 3/1993 | Fulton |
| 5,400,748 A | 3/1995 | Batzill et al. |
| 5,433,182 A * | 7/1995 | Augustin et al. ........... 123/456 |
| 5,479,903 A | 1/1996 | Werner et al. |
| 5,579,731 A | 12/1996 | Pong |
| 5,622,143 A | 4/1997 | Fuoss et al. |
| 5,771,860 A | 6/1998 | Bernardi |
| 5,778,833 A | 7/1998 | Kuranishi |
| 5,992,393 A | 11/1999 | Yoshida et al. |
| 6,105,542 A | 8/2000 | Efford |
| 6,178,932 B1 | 1/2001 | Matsuda et al. |
| 6,223,704 B1 | 5/2001 | Chatelain |
| 6,321,698 B1 | 11/2001 | Rau et al. |
| 6,615,776 B1 * | 9/2003 | Von Andrian-Werburg ...... 123/90.15 |
| 6,715,462 B2 * | 4/2004 | Bidner et al. ............ 123/198 F |

* cited by examiner

*Primary Examiner*—Mahmoud Gimie
(74) *Attorney, Agent, or Firm*—Christie, Parker & Hale, LLP (57) ABSTRACT

An engine system is provided. The inventive system includes a single engine which continues to operate at partial power after a single, or several, failures of any of several subsystems.

21 Claims, 3 Drawing Sheets

FAIL-OPERATIONAL INTERNAL COMBUSTION ENGINE

CROSS-REFERENCE TO RELATED APPLICATIONS

This application is a divisional application of U.S. application Ser. No. 10/762,983 filed on Jan. 22, 2004, which claims priority to and is based upon U.S. Provisional Application No. 60/442,138, which was filed on Jan. 22, 2003, the contents of both of which are fully incorporated herein by reference.

FIELD OF THE INVENTION

This invention relates to Internal Combustion (IC) engines and specifically to IC engines each having redundant subsystems controlling separate cylinders of the engine for achieving high operational reliability by continuing operation at partial power after failure of subsystems and to a method of operating the same.

BACKGROUND OF THE INVENTION

The IC engine, Otto or Diesel cycle piston engine, or rotary engine, have been in continuous development and improvement since the nineteenth century and have maintained a dominant position as powerplants for machines and vehicles. These engines range in output from a fraction of a horsepower to tens of thousands of horsepower.

The simplest IC engine, like the ones used in some model aircraft, can have a single piston, a single connecting rod, a crankshaft and a simple jet carburetor contained in a simple cylinder and crankcase structure. No ignition system is necessary if self igniting fuel, such as for example, diesel cycle fuel, is used. Such an air-cooled 2-cycle engine does not have all the valvetrain, lubrication system and liquid cooling systems of the common automotive engines.

In order to achieve high fuel efficiency, low exhaust emissions and smooth operation at a wide range of power levels, rotational speeds and environmental conditions, the modern IC engine deviates from simplicity and uses an increasing number of engine subsystems, sensors and controls. For example, a current design automobile engine includes the following:

a. Multiple cylinders (4–12) for smooth operation, which multiplies the pistons, rings, connecting rods, etc.

b. 4-cycle valvetrain with 4-valves per cylinder becoming more popular c. Fuel injection system (pump, injectors, pressure regulator, etc.)

d. Lubrication system (pump, pressure regulator, filter, etc.)

e. Liquid cooling system (pump, radiator, temperature control)

f. Throttle and ignition system in an Otto cycle engine g. Cold start system in a Diesel cycle engine h. Turbocharger or supercharger and intercooler in some engines i. Sophisticated engine control system which includes computer(s), intake air density sensors and in some cases exhaust gas sensors, variable intake manifold control, exhaust gas re-circulation system, etc.

The large number of subsystems, sensors, electrical wiring, liquids plumbing and controls increases the modes of possible failure of the modern IC engine. In automotive use, a very long and expensive development and testing cycle improves the subsystem reliability to a level acceptable for automotive use. In the vast majority of automotive cases an engine failure is not a safety issue and the expansive development and testing cycle is affordable for the largest automotive markets. But, in some specialty sports car markets engine reliability is a substantial problem, if the engine is not common to that of another car in large production.

In the aircraft industry, the significant chances of failures of the engine subsystems has caused the major aircraft markets to use turbine engines and the low-cost end of the aircraft market to use the reasonably reliable very simple (air-cooled, 2-valve per cylinder, mostly with carburetor and without turbocharger) engines developed in the 1930's and 1940's.

The aircraft is probably the best example where the combination of requirements of very high reliability, high performance and development cycle affordable for a low production rate caused the IC engine to be almost completely replaced by the turbine engine. Aircraft engine reliability is critical to flight safety especially in a large passenger aircraft because of long range flight over water or rough terrain, low chance of survival due to high glide speeds and lack of ejection seats common to fighter aircraft. The flight safety of passenger aircraft dramatically improved since the 1950's when the piston engine was rapidly replaced by the much simpler and more reliable turbine engine, even when four-engine aircraft were replaced by two-engine aircraft.

Currently, only the lowest cost aircraft for personal use and for training use are powered by IC engines. The most commonly used such IC engines were developed in the 1930's and 1940's, are air-cooled and very simple as compared to a modern car engine. The low number of subsystems in such engines and the improvement cycle of the last 50–60 years provided better reliability at the expense of lower performance and operational refinements.

In order to improve operational safety, both aircraft and ships use multiple engines. This propulsion redundancy makes the operation substantially more complex and in the case of an aircraft necessitates special training and pilot certification for multi-engine operation. In the case where the multi-engine propulsion is required to be coupled to a single driven device, as for example, the rotor system of a helicopter, a system of coupling and clutching is used to provide for operation of the rotor with one engine inoperative.

SUMMARY OF THE INVENTION

The present invention is directed to an IC engine system that can continue to operate with part-power after a single or multiple failures of engine subsystems and to a method of operating the same.

Modern high performance IC engines use multiple cylinders (or rotors in a rotary engine) to provide the required power and low vibration. Failures of these sophisticated engines are more likely to be a result of a subsystem failure than a result of a failure of the cranking mechanism, the lubrication system or the basic structure of the engine. To provide a higher powerplant reliability, the present invention does not combine multiple engines, but provides a single engine system which continues to operate at partial power after a single, or several, failure(s) of any and several subsystems except for the cranking system (pistons, connecting rods and crankshaft in the case of a piston engine, or rotors and rotor shaft in the case of a rotary engine), the lubrication system and the basic engine structure (crankcase, cylinder block(s) etc.). This fail operational mode in an exemplary embodiment engine system having two sets of subsystems is believed to provide 50% or more of full engine power and allows for a safe completion of the journey of the vehicle (aircraft, boat, etc.) or for a safe operation of a machine in which the powerplant is safety critical.

In an exemplary embodiment, a method for improving the reliability of an engine is provided. The method requires providing a single engine having an output shaft and first and second power producing members producing power driving the output shaft. The method also requires providing a first set of systems serving the first power producing member, and providing a second set of systems separated from the first set of systems and having the same type of systems as the first set of systems, the second set of systems serving the second power producing member, and operating the engine, whereby the power producing members drive the output shaft. Moreover, the method requires detecting degradation of a system of the first and second set of systems or degradation of one of the first and second power producing members, reducing a function of at least one system of the first and second sets of systems having the degraded system or serving the degraded power producing member, and continuing the operation of the engine with the power producing member served by the degraded system or the degraded power producing member producing a reduced power level relative to the other power producing member.

In another exemplary embodiment, a method for operating a single engine having an output shaft, a first power producing member and a second power producing member, where the first and second power producing members produce power to drive said output shaft, is provided. The method requires controlling the operation of a first fuel system providing fuel to operate the first power producing member, controlling the operation of a first set of systems serving the first power producing member, controlling the operation of a second fuel system providing fuel to operate the second power producing member, and controlling the operation of a second set of systems separate from the first set of systems and having systems of the same type as the first set of systems, the second set of systems serving the second power producing member. The method also requires detecting degradation of one system of the first and second set of systems or one of the power producing members, and reducing a function of at least one of the systems of the first and second set of systems for reducing the production of power by the power producing member served by the degraded system or by the degraded power producing member while maintaining the production of power by the other of the first and second power producing members and the continued operation of the engine.

In a further exemplary embodiment, a method for operating a single engine having an output shaft, a first power producing member and a second power producing member, where the first and second power producing members produce power to drive said output shaft, is provided. The method requires controlling the operation of a first set of systems serving the first power producing member, and controlling the operation of a second set of systems separate from the first set of systems and having the same type of systems as the first set of systems, the second set of systems serving the second power producing member. The method also requires detecting degradation of one system of the first and second set systems or of one of the first and second power producing members and reducing a function of at least one of the systems of said first and second set of systems serving the power producing member served by the degraded system or serving the degraded power producing member for reducing the production of power by the power producing member while maintaining the production of power by the other of the first and second power producing members and the continued operation of the engine.

In yet another exemplary embodiment, an engine system is provided. The engine system has a single engine having an output shaft, a first power producing member and a second power producing member, where both power producing members produce power to drive the output shaft. The system also includes a first set of systems serving the first power producing member, and a second set of systems serving the second power producing member, where the second set of systems is separate from the first set of systems and has systems of the same type as the first set of systems. The system also includes a first fuel system providing fuel to the first power producing member and not the second power producing member, and a second fuel system providing fuel to the second power producing member and not to the first power producing member, where the engine is operational when one of said fuel systems shuts down and no fuel is provided to one of the first and second power producing members.

In an exemplary embodiment, an engine system is provided having an engine having a crankshaft, a crankcase housing the crankshaft, a first piston coupled to the crankshaft at a location within the crankcase and reciprocating within a first cylinder, a second piston coupled to the crankshaft at a location within the crankcase and reciprocating within a second cylinder, a first fuel system providing fuel to the first cylinder, and a second fuel system providing fuel to the second cylinder. The first fuel system may include a first fuel pump and the second fuel system may include a second fuel pump. Moreover, the exemplary embodiment engine system may include a first cooling system coupled to the first cylinder, and a second cooling system coupled to the second cylinder. The exemplary embodiment engine system may also include a first temperature sensor coupled to the first cylinder, a first pressure sensor coupled to the first cylinder, a second temperature sensor coupled to the second cylinder, and a second pressure sensor coupled to the second cylinder. Furthermore, the exemplary embodiment engine system may include a first charge air supercharger coupled to the first cylinder and a second charge air supercharger coupled to the second cylinder. Moreover, the exemplary embodiment engine system may include a first controller coupled to the first fuel system for controlling fuel flow to the first cylinder and a second controller coupled to the second fuel flow system for controlling fuel flow to the second cylinder. In addition, an exemplary embodiment engine system includes a lubrication system shared by the first and second cylinders.

In another exemplary embodiment, an engine system is provided having an engine having a crankshaft, a crankcase housing the crankshaft, a first bank of pistons coupled to the crankshaft at a location within the crankcase and reciprocating within a first bank of cylinders, a second bank of pistons coupled to the crankshaft at a location within the crankcase and reciprocating within a second bank of cylinders, a first fuel system providing fuel to the first bank of cylinders, and a second fuel system providing fuel to the second bank cylinders. The first fuel system may include a first fuel pump and the second fuel system may include a second fuel pump. Moreover, this exemplary embodiment engine system may include a first cooling system coupled to the first bank of cylinders, and a second cooling system coupled to the second bank of cylinders. The exemplary embodiment engine system may also include a first temperature sensor coupled to the first bank of cylinders, a first pressure sensor coupled to the first bank of cylinders, a second temperature sensor coupled to the second bank of cylinders, and a second pressure sensor coupled to the second bank of cylinders. Furthermore, the exemplary embodiment engine system may include a first charge air supercharger coupled to the first bank of cylinders and a second charge air supercharger coupled to the second bank of cylinders. Moreover, the exemplary embodiment engine system may include a first controller coupled to the first fuel system for controlling fuel flow to the first bank of cylinders and a second controller coupled to the second fuel flow system for controlling fuel flow to the second bank of cylinders. In addition, an exemplary embodiment engine system includes a lubrication system shared by the first and second banks of cylinders.

In a further alternate embodiment, an engine system is provided having an engine having a crankshaft, a crankcase housing the crankshaft, a first piston coupled to the crankshaft at a location within the crankcase and reciprocating within a first cylinder, a second piston coupled to the crankshaft at a location within the crankcase and reciprocating within a second cylinder, a first subsystem coupled to the first cylinder for controlling and/or monitoring the operation of the first cylinder, and a second subsystem of the same type as the first subsystem coupled to the second cylinder for controlling and/or monitoring the operation of the second cylinder, wherein the first subsystem is separate from the second subsystem and wherein the first and second subsystems are selected from the group of systems consisting of fuel systems, air handling systems, sensor systems, cooling systems and control systems. The engine system may also have at least two first subsystems coupled to the first cylinder and at least two second subsystems of the same type as the first subsystems but separate from the first subsystems coupled to the second cylinder.

In another alternate embodiment, an engine system is provided having an engine having a crankshaft, a crankcase housing the crankshaft, a first set of pistons coupled to the crankshaft at a location within the crankcase and reciprocating within a first bank of cylinders, a second set of pistons coupled to the crankshaft at a location within the crankcase and reciprocating within a second bank of cylinders, a first subsystem coupled to the first bank of cylinders for controlling and or monitoring the operation of the first bank of cylinders, and a second subsystem of the same type as the first subsystem coupled to the second bank of cylinders for controlling and/or monitoring the operation of the second bank of cylinders, wherein the first subsystem is separate from the second subsystem and wherein the first and second subsystems are selected from the group of subsystems consisting of fuel systems, air handling systems, sensor systems, cooling systems and control systems. The engine system may also have at least two first subsystems coupled to the first bank of cylinders and at least two second subsystems of the same type as the first subsystems but separate from the first subsystems coupled to the second bank of cylinders.

In yet another alternate embodiment, an engine system is provided having a rotary engine having a first and a second rotor turning a single shaft, the first rotor housed in a first rotor housing, the second rotor housed in a second rotor housing, a first subsystem coupled to the first rotor housing for controlling and/or monitoring the operation of the first rotor, and a second subsystem of the same type as the first subsystem coupled to the second rotor housing for controlling and/or monitoring the operation of the second rotor, wherein the first subsystem is separate from the second subsystem. The first and second subsystems may be selected from the group of subsystems consisting of fuel systems, air handling systems, sensor systems, cooling systems and control systems. The engine system may also have at least two first subsystems coupled to the first rotor housing and at least two second subsystems of the same type as the first subsystems but separate from the first subsystems coupled to the second rotor housing.

In yet a further alternate embodiment, a method for operating an engine system having an engine having a crankshaft, a crankcase housing the crankshaft, a first piston coupled to the crankshaft at a location within the crankcase and reciprocating within a first cylinder, and a second piston coupled to the crankshaft at a location within the crankcase and reciprocating within a second cylinder, is provided. The method includes controlling the operation of a first set of subsystems causing the first piston to generate power, controlling the operation of a second set of subsystems of the same type as the first set of subsystems causing the second piston to generate power, detecting failure of one of the first and second sets of subsystems, identifying the piston served by the detected failed subsystem, and shutting down at least one subsystem of the first and second sets of subsystems for preventing the generation of power by the identified piston while maintaining the generation of power by the other of the first and second pistons and the continued operation of the engine system. The first and second subsystems may be selected from the group of systems consisting of fuel systems, air handling systems, sensor systems, cooling systems and control systems. In one example, fuel flow may be shut off to the cylinder in which the identified piston reciprocates so as to prevent the generation of power by the identified piston.

In yet another alternate embodiment, a method for operating a fail operational engine system having an engine having a crankshaft, a crankcase housing the crankshaft, a first set of pistons coupled to the crankshaft at a location within the crankcase and reciprocating within a first bank of cylinders, and a second set of pistons coupled to the crankshaft at a location within the crankcase and reciprocating within a second bank of cylinders, is provided. The method includes controlling the operation of a first set of subsystems causing the first set of pistons to generate power, controlling the operation of a second set of sub systems of the same type as the first set of subsystems causing the second set of pistons to generate power, detecting failure of one of the first and second sets of subsystems, identifying the set of pistons served by the detected failed subsystem, and shutting down at least one subsystem of the first and second sets of subsystems for preventing the generation of power by the identified set of pistons while maintaining the generation of power by the other of the first and second set of pistons and the continued operation of the engine system. The first and second subsystems may be selected from the group of systems consisting of fuel systems, air handling systems, sensor systems, cooling systems and control systems. In one example, fuel flow may be shut off to the bank of cylinders in which the identified set of pistons reciprocated so as to prevent the generation of power by the identified set of pistons.

In yet a further alternate embodiment, a method for operating a fail operational engine system having a rotary engine a rotary engine having a first and a second rotor turning a single shaft, the first rotor housed in a first rotor housing, the second rotor housed in a second rotor housing. The method includes controlling the operation of a first set of subsystems causing the first rotor to generate power, controlling the operation of a second set of subsystems of the same type as the first set of subsystems causing the second rotor to generate power, detecting failure of one of the first and second sets of subsystems, identifying the rotor served by the detected failed subsystem, and shutting down at least one subsystem of the first and second sets of subsystems for preventing the generation of power by the identified rotor while maintaining the generation of power by the other of the first and second rotors and the continued operation of the engine system, wherein the first and second subsystems are selected from the group of systems consisting of fuel systems, air handling systems, sensor systems, cooling systems and control systems. In one example, fuel flow may be shut off to the rotor housing which houses the identified rotor so as to prevent the generation of power by the identified rotor.

In another exemplary embodiment an engine system is provided having an engine having a first power producing member and a second power producing member. A first fuel system provides fuel to the first power producing member, and a second fuel system provided fuel to the second power producing member. In exemplary embodiment each power producing member may be a piston, a piston and cylinder combination with the piston reciprocating within the cylinder, a rotor, or a rotor and rotor housing combination with the rotor rotating within the housing. In exemplary embodiments, the engine may be an Otto cycle engine, a rotary engine or another type of engine.

In further exemplary embodiment, an engine system is provided having an engine having a first power producing member and a second power producing member. A first system coupled to the first power producing member, and a second system of the same type as the first system coupled to the second power producing member. The first system is separate from the second system and the first and second systems may be selected from the group of systems consisting of fuel systems, air handling systems, cooling systems and sensor systems.

In another exemplary embodiment an engine system is provided including a single engine having an output shaft, first power producing member and a second power producing member, wherein both power producing members produce power to drive the output shaft. The system also includes a first set of systems serving the first power producing member but not the second power producing member, and a second set of systems serving the second power producing member but not the first power producing member. The second set of systems is separate from the first set of systems and includes systems of the same type as the first set of systems. This exemplary embodiment engine is operational when one system of the first and second set of systems is inoperative. In another exemplary embodiment, the engine is operational when more than two systems of said sets of systems are fully or partially inoperative. The system may further include a computer controlling the operation of each system of said first and second sets of systems. The computer may monitor an output of each fuel system and each system of the first and second sets of systems and control the operation of each of the systems in response to the monitored outputs. The computer may shut down the operation of one or more systems in one of the first and second sets of systems in response to the monitored outputs of one or more systems in the one of said first and second sets of systems. The computer may also reduce the operation of one or more systems in one of the first and second sets of systems in response to the monitored outputs of one or more systems in said one of the first and second sets of systems.

In yet another exemplary embodiment, a method for operating an engine having a first power producing member and a second power producing member is provided. The method requires controlling the operation of a first fuel system providing fuel to operate the first power producing member and controlling the operation of a first system allowing the first power producing member to generate power. The method further requires controlling the operation of a second fuel system providing fuel to operate the second power producing member and controlling the operation of a second system of the same type as the first system and separate from the first system allowing the second power producing member to generate power. The method also requires detecting failure of one system, identifying the power producing member served by the detected failed system, and shutting down at least one of the systems for preventing the generation of power by said identified power producing member while maintaining the generation of power by said other of said first and second power producing member and the continued operation of the engine.

In another exemplary embodiment, a method for operating an engine having a first power producing member and a second power producing member is provided. The method requires controlling the operation of a set of first systems allowing the first power producing member to generate power and controlling the operation of a set of second systems of the same type as the first systems and separate from the first systems allowing the second power producing member to generate power. The method also requires detecting failure of one system of said first and second set systems, identifying the power producing member served by the detected failed system, and shutting down at least one of the appropriate systems of said first and second set of systems for preventing the generation of power by said identified power producing member while maintaining the generation of power by said other of said first and second power producing member and the continued operation of the engine.

In yet a further exemplary embodiment, an advanced high performance six-cylinder diesel engine, the complete subsystems including fuel systems, liquid cooling systems, valvetrains, turbochargers, wastegates, intercoolers, intake and exhaust manifolds, sensors, computers and electric wiring harnesses are in duplicates, one set for the left hand (LH) side of the horizontally-opposed engine and one set for the right hand (RH) side. Any failure of one or more of the LH side systems will allow the engine to continue part power operations on the RH side and vice-versa. With the failed side of the engine disabled (zero fuel injected) and the cranking and lubrication systems operational, the engine will produce 50% of full power at a slightly increased vibration level and specific fuel consumption. This will provide the same capability to continue the mission as provided by a two-engine propulsion system.

In other exemplary embodiments, more than two sets of subsystems are used. For example, three sets of subsystems may be used each set coupled to a subset of cylinders (or rotors in a rotary engine). Moreover, in other exemplary embodiments, one set of subsystems may be coupled to a first set of cylinders and a second set of subsystems may be coupled to a second set of cylinders where the number of cylinders in the first set is different from the number of cylinders in the second set.

In the aerospace industry, the vast data accumulated during the last 5 decades regarding failures, reliability and flight safety were used to analyze the desirability of single-engine vs. two-engine in fighter aircraft and in helicopters. The complexity of the two-engines results in a larger and more expensive aircraft to achieve the same utility and performance. In addition, the two-engine aircraft requires more maintenance and has lower availability (being ready to fly when needed) than the single-engine aircraft. The present invention, by providing redundancy in selected engine subsystems, provides most of the reliability improvement of multiple engines while avoiding the majority of increased complexity, weight, cost and maintenance of the multiple-engines. In addition, if a single output shaft is desired, the present invention avoids the added complexity, weight, cost and maintenance of the combining gearbox and clutching mechanism.

DETAILED DESCRIPTION OF THE INVENTION

The present invention provides an IC engine that can continue to operate with part-power after a single or multiple failures of engine subsystems and to a method of operating the same. With the present invention the added complexity, weight, cost and maintenance of using two engines—for providing operation of a vehicle when one engine fails—with two individual output shafts coupled to two individual propellers (in the case of aircraft or ships) or to two individual drivetrains may be avoided. Moreover the additional complexity, weight, cost and maintenance of coupling two engines to a single propeller or drivetrain through a combining gearbox and a clutching mechanism is also avoided.

Figure 1:
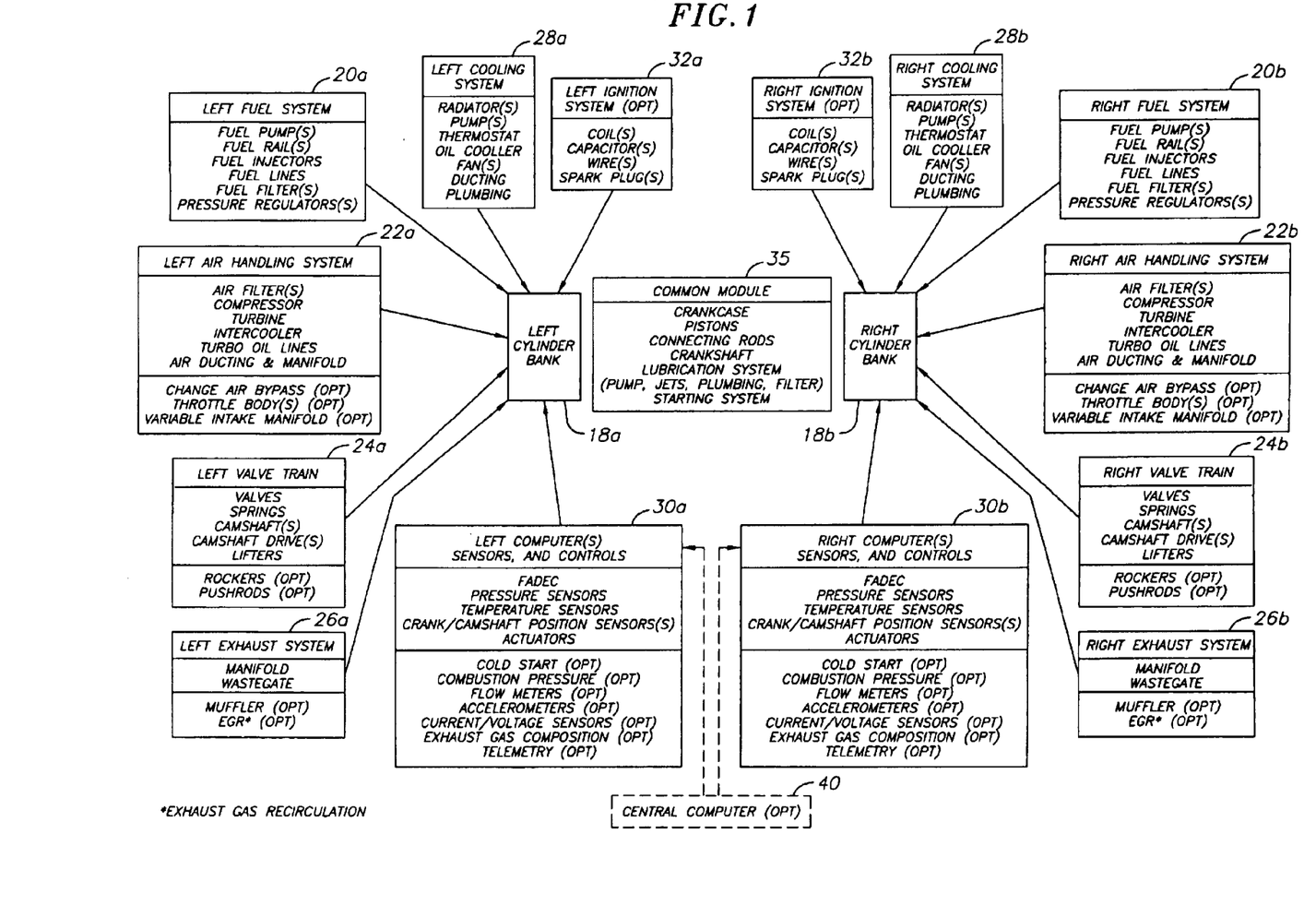
FIG. 1 is a schematic of the multiple subsystems of an exemplary embodiment piston engine of the present invention.

In order to provide high fuel efficiency, low exhaust emissions and smooth operation at a wide range of operational parameters and environmental conditions, the modern IC engine evolved into a complex system with multiple subsystems. FIG. 1 depicts the schematic of an exemplary embodiment IC engine system of the present invention with the redundant subsystems of the present invention as applied to a multi-cylinder piston engine. FIG. 1 depicts two sets of subsystems. However, in other exemplary embodiments, more than two sets of subsystems may be used. At the center of FIG. 1, is the engine common module consisting of the crankcase structure, pistons, connecting rods, crankshaft and lubrication system. A failure of these items may fail the complete engine. However, in a modern well-developed engine this type of failure is uncommon.

Figure 2:
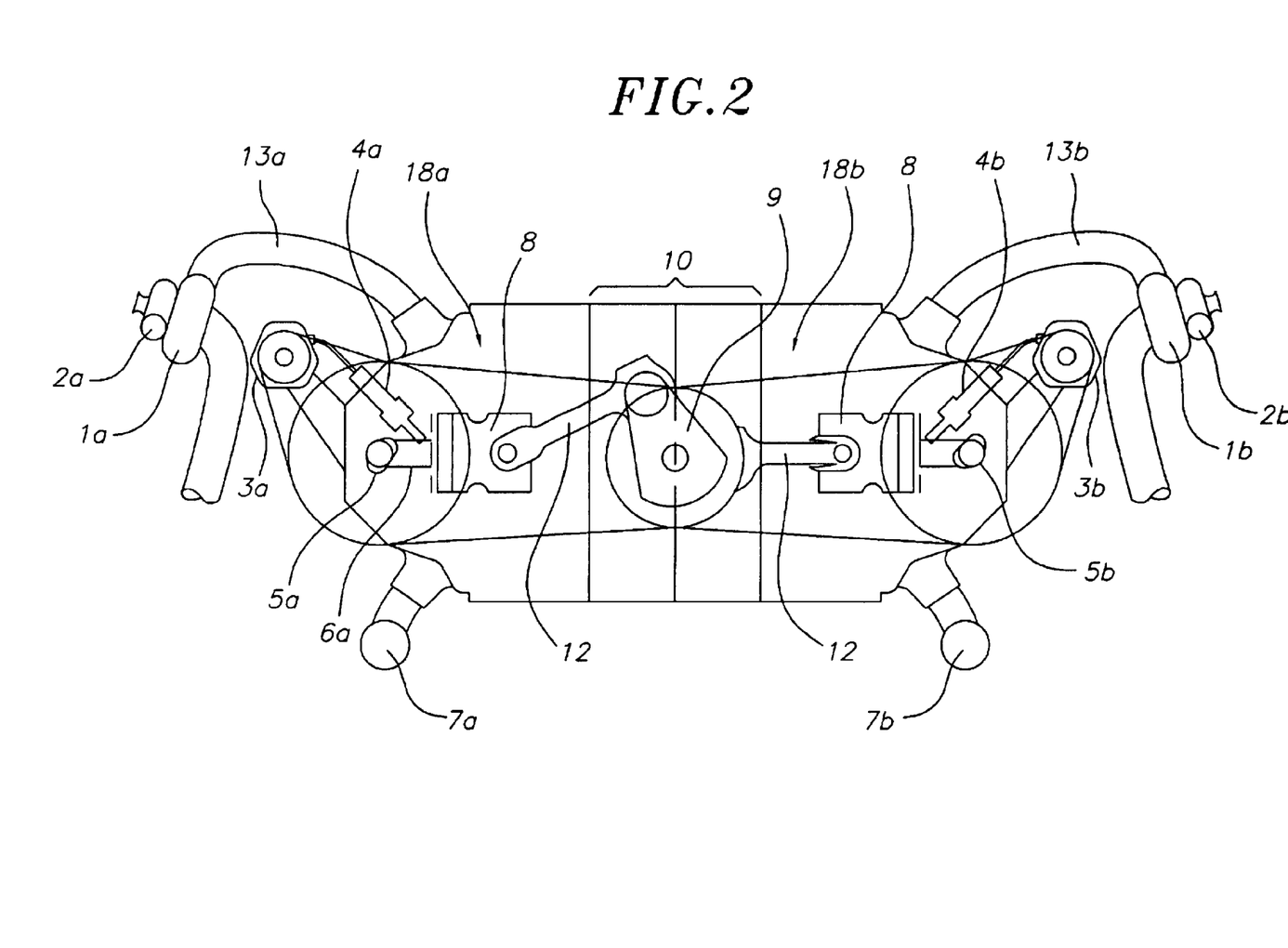
FIG. 2 is a schematic cross-sectional view of an exemplary embodiment diesel engine of the present invention.

FIG. 2 shows a schematic cross section of an exemplary embodiment diesel engine, where a cranking system includes the crankshaft 9, connecting rods 12, the pistons 8. These components, the crankcase structure 10 and the lubrication system are essential for the operation of the engine. The engine starting system is not essential for continued engine operation and is automatically de-clutched on exemplary embodiment IC engines after engine start.

The left side of FIG. 1 shows the subsystems most commonly used to operate a modern high performance IC engine which are connected to the left bank of the engine of the present invention. Some of the subsystems are marked as optional (Opt. in FIG. 1) because they are not necessary in all engines as is well known in the art. For example, a diesel engine does not require an ignition system. The level of complexity of the subsystems becomes apparent from FIG. 1. For example, a 6-cylinder engine composed of two banks of cylinders, that has 4-valves per cylinder has 12 valves per each bank with all the ancillary valve guides, lifters, springs, camshafts and camshaft drive system.

In an exemplary embodiment of the present invention, all subsystems connected to the left bank of the engine are duplicated for the right bank of the engine and the two sets of redundant subsystems are completely isolated from each other to avoid related subsystems failures of the left hand and right hand subsystems. It should be understood that the terms "left" and "right" are used herein to denote relative positions for descriptive purposes only and should not be construed to denote exact positions.

Exemplary subsystems for each bank of cylinders 18a, 18b, as shown in FIGS. 1 and 2 may include: (1) a fuel system 20a or 20b which may include one or more fuel pumps 3a or 3b, one or more fuel rails, one or more fuel injectors 4a or 4b, one or more fuel filters, and one or more pressure regulators; (2) an air handling system 22a or 22b which may include one or more air filters, one or more air compressors 2a or 2b, one or more turbines 1a or 1b, one or more turbo oil lines, air ducting and manifold 7a or 7b, a charge air bypass, one or more throttle bodies and a variable intake manifold; (3) a valve train 24a or 24b which may include valves 6a or 6b, springs, one or more camshafts 5a or 5b, one or more camshaft drives, lifters, rockers and pushrods; (4) an exhaust system 26a or 26b which may include an exhaust manifold 13a or 13b, a wastegate, a muffler, and a Exhaust Gas Recirculation (EGR); (5) a cooling system 28a or 28b which may include one or more radiators, one or more cooling fluid or water pumps, a thermostat, an oil cooler, one or more fans, ducting and plumbing; (6) a computer, sensor and control system 30a or 30b which may include a Full Authority Digital Engine Control (FADEC) or a digital computer, one or more pressure sensors, one or more temperature sensors, one or more crank and/or camshaft position sensors, one or more actuators, cold start system (allowing for starts in very cold environments), one or more combustion pressure sensors, one or more flow meters, one or more accelerometers, one or more current and/or voltage sensors, one or more exhaust gas composition sensors, and telemetry (e.g., sensors and receivers for transferring the signals generated by the engine sensors to a remote location); and (7) an ignition system 32a or 32b which may include one or more coils, one or more capacitors, wires and one or more spark plugs.

Figure 3:
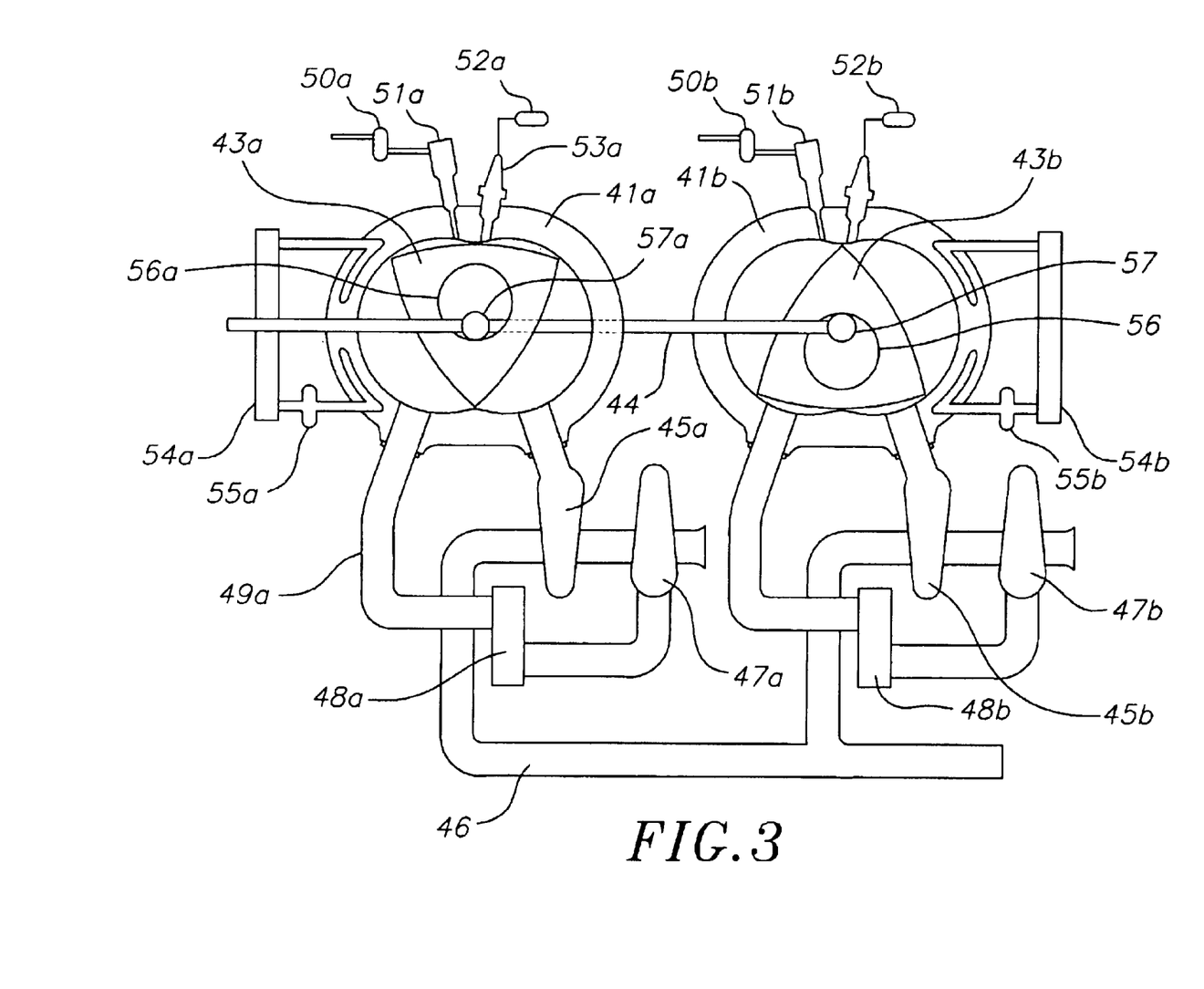
FIG. 3 is a schematic cross-sectional view of an exemplary embodiment rotary engine of the present inventing showing the two rotors side by side for illustrative purposes.

In FIG. 1, the exemplary subsystems are shown in relation to an engine such as an Otto cycle or a diesel engine having a common module 35 which includes a crankcase, pistons, connecting rods, crack shaft and a lubrication system and may include various pumps, plumbing, filters and a starting system. However, in other exemplary embodiments, a select set of the subsystems disclosed in FIG. 1 may be coupled to various rotors in a multiple rotor rotary engine (Wankel cycle engine). For example, a multiple rotary engine may consist of four rotors, where one set of subsystems is coupled to two rotors and a second set of subsystems is coupled to the remaining two rotors. In FIG. 3, an exemplary two rotor rotary engine of the present invention is shown.

This exemplary embodiment engine has two rotor housings 41a and 41b. The housing are stacked one behind the other. In other words, housing 41a is in front of housing 41b. For illustrative purposes, FIG. 3 shows the two housings 41a and 41b side by side. Each housing has a rotor 43a and 43b, respectively. In the exemplary embodiment, subsystems including a turbine 45a, a compressor 47a, a cooler 48a, an inlet manifold 49a, a fuel pump 50a, a fuel injector 51a, a coolant radiator 54a and a coolant pump 55a are coupled to the first rotor 43a and first rotor housing 41a. An ignition system 52a including a spark plug 53a may also be coupled to the first rotor and first rotor housing. Similarly, subsystems including a turbine 45b, a compressor 47b, a cooler 48b, an inlet manifold 49b, a fuel pump 50b, a fuel injector 51b, a coolant radiator 54b and a coolant pump 55b are coupled to the second rotor 43b and second rotor housing 41b. An ignition system 52b including a spark plug 53b may also be coupled to the second rotor and second rotor housing. In the described exemplary embodiment, both rotors share a common exhaust manifold 46.

In an exemplary embodiment engine system shown in FIG. 1, a Full Authority Digital Engine Control (FADEC) commonly used in controlling modern aircraft turbine engine, or a digital computer commonly used in automotive applications, detects the failure of the subsystem(s) or any part of one bank based on input by the sensors which monitor total engine performance (vibration, power or torque vs. injected fuel, etc.) and/or by the measured parameters of each bank (combustion pressure, water temperature, water pressure, exhaust gas temperature, etc.) and shuts the fuel supply to that engine side and brings to zero the fuel injection pulse width.

Because the engine can continue operation even while the failed side is supplied with fuel, the reviewing of the data provided by the engine sensors (e.g., water temperature, exhaust gas temperature), the decision and the action of shutting one side of the engine does not have to be done quickly, for example it may be accomplished in 1–3 minutes by a human operator, although on an advance vehicle or machine it may be made very quickly by the vehicle or machine central computer(s) 40. The shut-down actions will probably be multiple and separately timed. The fuel shut-down does not mean immediate shut-down of the of the cooling fan(s) or the opening/closing of the wastegate, as such actions can be unhelpful and therefore have to be time-phased to maximize the power and longevity of the operative side of the engine.

In an exemplary embodiment advanced high performance horizontally-opposed 6-cylinder diesel engine system, as shown in FIG. 2, the subsystems are duplicated for the left bank of three cylinders and the right bank of three cylinders. Being a diesel engine it does not use an ignition system or a throttle body (marked optional in FIG. 1). The exemplary embodiment engine also does not incorporate charge air bypass and Exhaust Gas Recirculation (EGR). But, it has a FADEC and all the sensors, actuators and telemetry listed in FIG. 1 except for the exhaust gas composition sensor. In an exemplary embodiment the vehicle or machine central computer(s) 40 alert the human operator about the failure, the nature of the failure and which engine side FADEC is reporting the failure. The central computer can be programmed to shut-down the failed engine side after a pre-set time delay if the human operator does not override the central computer by either shutting-down earlier, delaying the shut-down or not shutting-down.

All above-mentioned reviewing of data, decisions and actions described for the case of a complete subsystem failure are also valid for partial failures or subsystem deterioration. The FADEC of one engine side, the central computer or the human operator can command a power reduction on one engine side to delay or avoid a complete failure of such engine side. From this aspect the present invention is similar or identical to the operation of a two-engine vehicle or machine.

The crankshaft of horizontally-opposed piston engines can have the same crank angles for each bank of cylinders as those of an in-line engine of the same number of cylinders per bank. An opposed 6-cylinder engine in the exemplary embodiment with 120° separated crank angles is completely balanced both with cylinder gas pressure and mass-only without gas pressure so as to minimize vibrations. It is believed that a 6-cylinder engine having two sets of subsystems, one for operating and monitoring one bank of cylinders and one for operating and monitoring the other bank of cylinders, will operate as a 3-cylinder engine at only slightly higher vibration level and with an estimated power reduction of only 3.5% for the 3-cylinder bank at the same rotational speed (RPM) and same boost pressure of full 6-cylinder operation. In other words, it is believed that the entire engine will operate at 46.5% of total power. If required, a 3.5% increase in boost pressure should overcome the 3.5% power reduction and allow the entire engine to operate at 50% power. The Specific Fuel Consumption in pounds per horsepower per hour will be 3.5% higher accordingly. The reliability and longevity of such an engine system running on a single engine side (i.e., bank) is the same as that of the single engine in a full 6-cylinder operation at the same power level per bank. Therefore, if so desired, most modern fixed wing aircraft utilizing such engine system can take-off, climb to a reasonable altitude (7,000 ft. to 15,000 ft. in most aircraft) complete a long range flight and safely land with one side of the engine inoperative. This complete journey, or operation, is also true for a boat, ground vehicle or a machine where minimum power for safe operation is less than 50% of total power which is typically the basis for the safety of 2-engine vehicles.

Because of the smooth operation of the engine with one side inoperative, it is important to provide a procedure to check each side of the engine before starting a long vehicle journey or in case of aircraft before take-off. This short procedure may follow the procedure common to all light aircraft with an IC engine equipped with dual-engine ignition systems where the engine is run at high power with both ignition systems (magnetos), then one ignition system is shut down and the power drop is observed. Afterwards, both ignition systems are turned on. Following, the other ignition system is shut-down and the power drop is observed. Finally, both ignition systems are turned on. A power drop, with either ignition system shut down, greater than a predetermined amount may be indicative of engine subsystem malfunction.

In another exemplary embodiment, the engine system may be fully computerized and well instrumented providing full continuous health monitoring of both sides (i.e., banks) of the engine. With such an embodiment, a "pre-flight check" or pre-operation check procedure may not be necessary. For example the FADEC can be used to check and report the health of an engine in a similar manner that a FADEC is used to report and check the operation of multiple engines of an aircraft before take-off without shutting-down the engines.

An important advantage of the present invention is that although it substantially reduces the chances of complete engine failure it does not require a substantial increase in the weight, volume, and mechanical complexity of a conventional engine. For example, many turbocharged aircraft engines already use twin turbochargers to ease the installation in the aircraft by providing two smaller turbochargers instead of one larger turbocharger. Also many family cars use dual radiators and dual cooling fans for ease of installation in the hood space which is limited by hood height and to accommodate cooling air intakes. Such dual turbochargers and dual radiators are not incorporated in conventional engines to provide redundancy. Most of the additional subsystems providing redundancy in the present invention are very compact and lightweight so they do not substantially add to the overall weight of the engine system.

In further exemplary embodiment engine systems, more than two sets of subsystems may be used. For example, three, four or more sets of subsystems may be used each set coupled to a subset of cylinders (or rotors in a rotary engine) for operating and/or monitoring the operation of the cylinders (or rotors). Moreover, in other exemplary embodiments, one set of subsystems may be coupled to a first set of cylinders (or rotors) and a second set of subsystems may be coupled to a second set of cylinders (or rotors) where the number of cylinders (or rotors) in the first set is different from the number of cylinders (or rotors) in the second set. In the case where a first set of subsystems is coupled to a first set of cylinders (or rotors) and a second set of subsystems is coupled to a second set of cylinders (or rotors) having less cylinders (or rotors) than the first set of cylinders (or rotors), if failure occurs in the first set of subsystems causing the first set of cylinders (or rotors) to shut-off, the engine will operate with less than 50% of power, and if failure occurs to the second set of subsystems causing the second set of cylinders (or rotors) to be shut-off, the engine will continue to operate with more than 50% power.

Each set of subsystems may coupled to a predetermined subset of cylinders (or rotors in a rotary engine). For example when two sets of subsystems are used in combination with an opposed or a V-type engine, the first set of subsystems may be coupled to one set of cylinders consisting of all the cylinders on the left side of the engine when viewing the engine from its front end and the second set of subsystems may be coupled to the right set of cylinders consisting of all the cylinders on the right side of the engine when viewing the engine from its front end.

In one embodiment, to minimize vibrations it may be desirable to have the first set of subsystems coupled to the cylinders making up the odd entries in the firing order of the engine, i.e., the cylinders that fire first, third, fifth, etc., and the second set of subsystems coupled to the cylinders making up the even entries in the firing order of the engine, i.e., the cylinders that fire second, fourth, sixth, etc. With this embodiment, a six cylinder opposed or a six cylinder V-type engine, will have the first set of subsystems coupled to cylinders on the left side of the engine (i.e., cylinders 1, 3 and 5) and one set of subsystems coupled to the cylinders on the right side of the engine (i.e., cylinders 2, 4 and 6). However, with a different engine, as for example an eight cylinder V-type engine, in order to reduce vibration, this embodiment will require that the first set of subsystems be coupled to cylinders 1, 4, 6, and 7, and the second set of subsystems be coupled to cylinders 8, 3, 5 and 2. Since, the odd number cylinders are on one side of the engine and the even number cylinders are on the other side of the engine, with this embodiment, the first set of subsystems will be coupled to cylinders on both sides of the engine and the second set of subsystems will be coupled to cylinders on both sides of the engine. With such an embodiment, instead of a single cooling block for each cylinder bank, i.e., for the cylinders on each side of the engine, individual cooling jackets may be coupled to each cylinder, and the cooling jackets of cylinders within each subset (i.e., within each set of cylinders coupled to, i.e., served by, the same set of subsystems) should be in fluid communication with each other. In an alternate exemplary embodiment, even with an eight cylinder V-type engine cylinders 1, 3, 5 and 7 may be coupled to a first set of subsystems and cylinders 2, 4, 6, and 8 may be coupled to a second set of subsystems.

The inventive engine systems of the present invention are tolerant to external damage influence. In other words, if any of the subsystems or their components or any cylinder or rotor of an inventive engine system is damaged by external sources, the engine will continue to operate. Moreover, the level of increase in reliability of IC engines provided by the present invention will increase as the current trend of engine modernization as characterized by an increased use of sensors, electric actuators and computers, continues.

The IC engine system of the present invention may be a diesel engine system, an Otto-cycle engine or a rotary engine (Wankel) system. Moreover the engine system of the present invention may be an opposed engine, a V-type engine, an in-line engine, a radial engine or any other type of engine. The engine may include two or more cylinders (or rotors). Each bank of cylinders may include one or more cylinders. Moreover, the engine system of the present invention may be used to power any vehicle or machine. Furthermore, IC engine systems of the present invention may be formed by converting existing engines by adding the required subsystems to form multiple subsystems or may be designed and manufactured with multiple subsystems.

In an alternate embodiment, if one or more subsystem fail, instead of shutting down the power generated by the piston (s) or rotor(s) served by the failed subsystem(s), the power generated by such piston(s) or rotor(s) may be reduced. For example, if there is overheating in one cylinder or rotor housing, the power generated by the corresponding piston or rotor may be reduced for the purpose of reducing the cylinder or rotor housing temperature. In this regard, the reduction in overall engine power will be less than if such piston or rotor was prevented from generating power.

The preceding description has been presented with reference to exemplary embodiments of the invention. Persons skilled in the art and technology to which this invention pertains will appreciate that alterations and changes in the described structures and methods of operation can be practiced without meaningfully departing from the principal, spirit and scope of this invention. Accordingly, the foregoing description should not be read as pertaining only to the precise structures and methods described and shown in the accompanying drawings.

What is claimed is:

1. An engine system comprising:
   a single engine having an output shaft, first power producing member and a second power producing member, wherein both power producing members produce power to drive the output shaft;
   a first set of systems serving the first power producing member;
   a second set of systems serving the second power producing member, wherein the second set of systems is separate from the first set of systems and comprise systems of the same type as the first set of systems;
   a first fuel system including a first fuel source providing fuel to the first power producing member and not the second power producing member; and a second fuel system including a second fuel source separate from the first fuel source providing fuel to the second power producing member and not to the first power producing member, wherein the engine is operational when one of said fuel systems shuts down and no fuel is provided to one of said first and second power producing members.

2. The system according to claim 1 wherein the first set of systems do not serve the second power producing member and wherein the second set of systems do not serve the first power producing member.

3. The system as recited in claim 1 wherein the engine is selected from the group of engines consisting of Otto cycle, diesel and rotary engines and wherein the power producing members are selected from the group of power producing members consisting of pistons and rotors.

4. The system as recited in claim 1 wherein the first and second set of systems each comprise systems selected from the group of systems consisting of air handling systems, sensor systems, cooling systems and control systems.

5. The system as recited in claim 4 wherein the air handling systems each comprise at least one of a turbocharger and supercharger, wherein the sensor systems each comprise a temperature sensor, and wherein the cooling systems each comprise a cooler.

6. The system as recited in claim 1 wherein the engine is operational when said one of said fuel systems shuts down and one system of said sets of subsystems is fully or partially inoperative.

7. The system as recited in claim 1 further comprising a computer controlling the operation of each fuel system and each system of said first and second sets of systems.

8. The system as recited in claim 7 wherein the computer monitors the function of each fuel system and each system of said first and second sets of systems and controls the operation of each of said systems in response to the monitored functions.

9. An engine system comprising:
a single engine having an output shaft, first power producing member and a second power producing member, wherein both power producing members produce power to drive the output shaft;
a first set of systems serving the first power producing member but not the second power producing member; and
a second set of systems serving the second power producing member but not the first power producing member, wherein the second set of systems is separate from the first set of systems and comprise systems of the same type as the first set of systems, wherein said engine is operational when two systems of said first and second set of systems are inoperative.

10. The system as recited in claim 9 wherein the engine is operational when more than two systems of said sets of systems are fully or partially inoperative.

11. The system as recited in claim 9 wherein the engine is selected from the group of engines consisting of Otto cycle, diesel and rotary engines and wherein the power producing members are selected from the group of power producing members consisting of pistons and rotors.

12. The system as recited in claim 9 wherein the first and second set of systems each comprise systems selected from the group of systems consisting of fuel systems, air handling systems, sensor systems, cooling systems and control systems.

13. The system as recited in claim 12 wherein the fuel systems each comprise a fuel pump, wherein the air handling systems each comprise at least one of a turbocharger and supercharger, wherein the sensor systems each comprise a temperature sensor, and wherein the cooling systems each comprise a cooler.

14. The system as recited in claim 9 further comprising a computer controlling the operation of each system of said first and second sets of systems.

15. The system as recited in claim 14 wherein the computer monitors the output of each fuel system and each system of said first and second sets of systems and controls the operation of each of said systems in response to the monitored outputs.

16. The system as recited in claim 15 wherein the computer shuts down the operation of one or more systems in one of said first and second sets of systems in response to the monitored outputs of one or more systems in said one of said first and second sets of systems.

17. The system as recited in claim 15 wherein the computer reduces the operation of one or more systems in one of said first and second sets of systems in response to the monitored outputs of one or more systems in said one of said first and second sets of systems.

18. The system as recited in claim 9 wherein said engine is operational when the two systems of said first and second set of systems are inoperative and wherein said two systems are different systems from the same set of systems.

19. The system as recited in claim 9 wherein said engine is operational when the two systems of said first and second set of systems are inoperative and wherein one system of said two sets of systems is from the first set of systems and the other of said two systems is from the second set of systems.

20. The system as recited in claim 19 wherein said one of said two sets of systems is a different system from said other system of said two sets of systems.

21. An engine system comprising:
a single engine having an output shaft, and at least two power producing members, wherein said power producing members produce power to drive the output shaft; and
at least two sets of systems, wherein each set of systems serves only one of the power producing members, wherein each set of systems serves a different power producing member, and wherein each set of systems is separate from the other set of systems, and wherein said engine is operational when two systems of said at least two sets of systems are inoperative.

* * * * *